United States Patent [19]

Egli et al.

[11] Patent Number: 4,672,564

[45] Date of Patent: Jun. 9, 1987

[54] METHOD AND APPARATUS FOR DETERMINING LOCATION AND ORIENTATION OF OBJECTS

[75] Inventors: Werner H. Egli, Minneapolis; John W. Miller, St. Paul; Jeffrey M. Setterholm, Minnetonka, all of Minn.

[73] Assignee: Honeywell Inc., Minneapolis, Minn.

[21] Appl. No.: 671,728

[22] Filed: Nov. 15, 1984

[51] Int. Cl.⁴ .................... G01B 11/26; G01B 13/00
[52] U.S. Cl. .................................. 364/559; 358/107; 364/516; 364/525
[58] Field of Search .............. 364/516, 525, 550, 559; 358/107, 903; 356/138, 152, 153, 363; 250/561

[56] References Cited

U.S. PATENT DOCUMENTS

| 3,769,442 | 10/1973 | Heartz et al. | 364/516 |
| 3,793,481 | 2/1974 | Ripley et al. | 358/107 |
| 3,922,533 | 11/1975 | Royal | 364/516 |
| 4,238,828 | 12/1980 | Hay et al. | 364/516 |
| 4,360,885 | 11/1982 | Edgar | 364/525 |
| 4,396,945 | 8/1983 | Di Matteo et al. | 358/107 |
| 4,453,224 | 6/1984 | Crooks, Jr. | 364/525 |
| 4,471,448 | 9/1984 | Williams | 364/559 |
| 4,545,576 | 10/1985 | Harris | 364/516 |

FOREIGN PATENT DOCUMENTS 2420204  7/1975  Fed. Rep. of Germany ...... 364/559

*Primary Examiner*—Gary Chin
*Assistant Examiner*—Kevin J. Teska
*Attorney, Agent, or Firm*—Robert A. Pajak

[57] ABSTRACT

A target plane in fixed relationship to an object provides a first triad of three collinear target points which lie on a first line projection and a second triad of target points which lie on a second line projection which is in nonalignment with the first triad. A photo detector image plane obtains images of the target points projected on the image plane through a lens located a fixed distance from the image plane. Simple algebraic manipulation of image plane position coordinates of the images corresponding to the target points provides for the establishment of vector replicas of the position of the target points. The vector replicas, in turn, are sufficient data to provide spatial information about the object including position and oriention information with full six-degrees-of-freedom.

48 Claims, 7 Drawing Figures

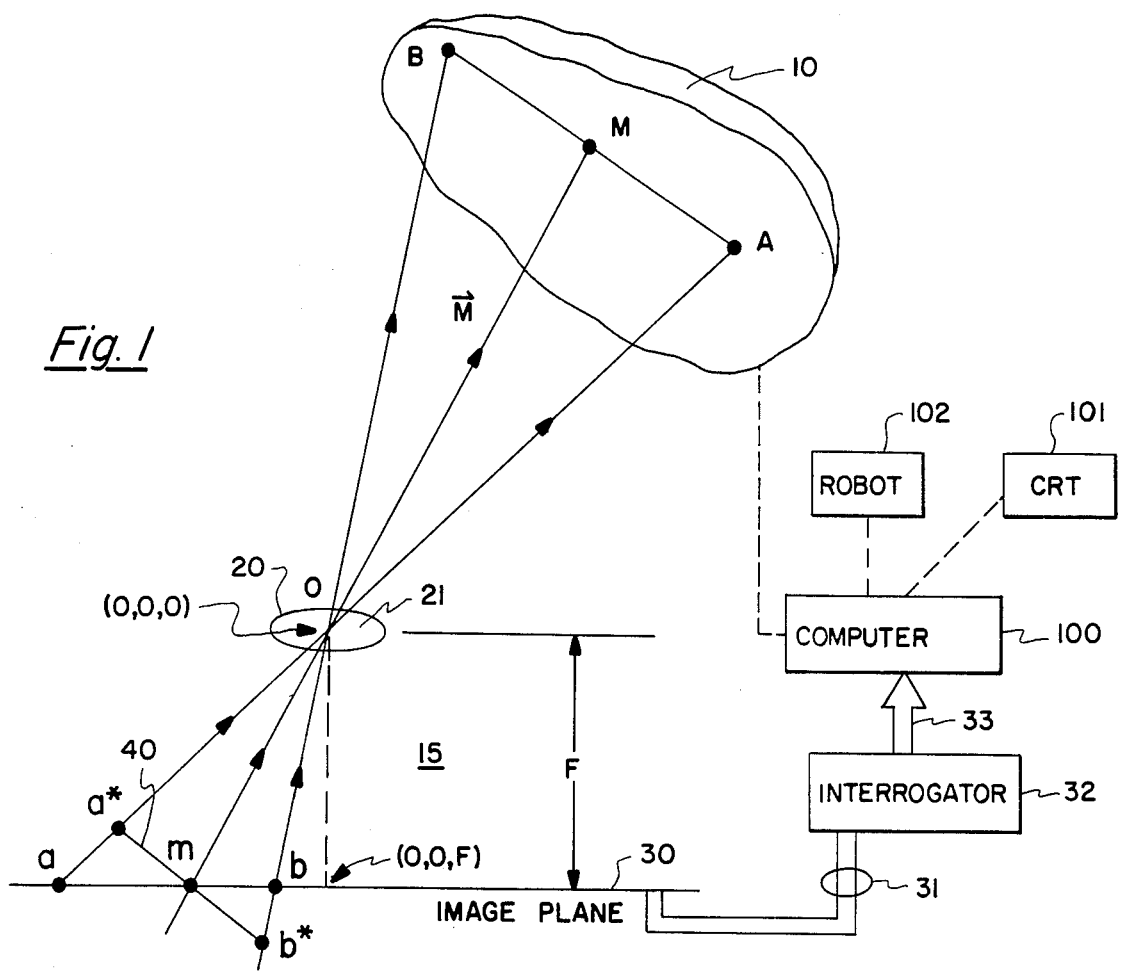
Fig. 1
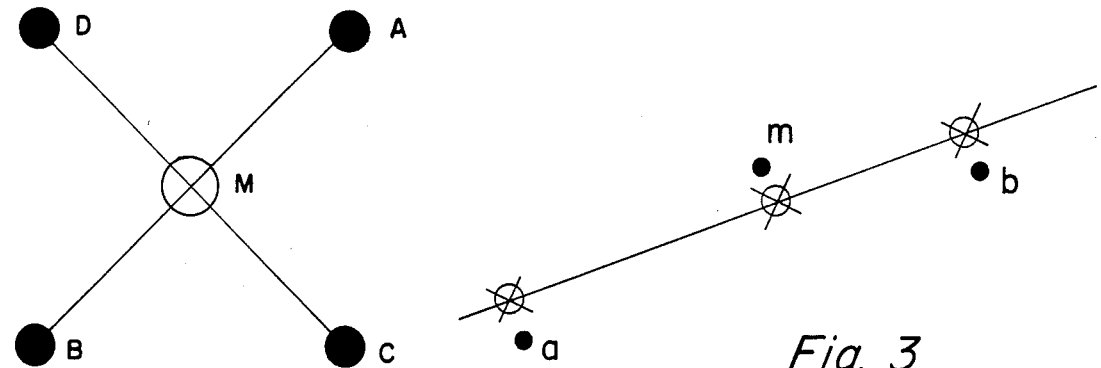
Fig. 2
Fig. 3
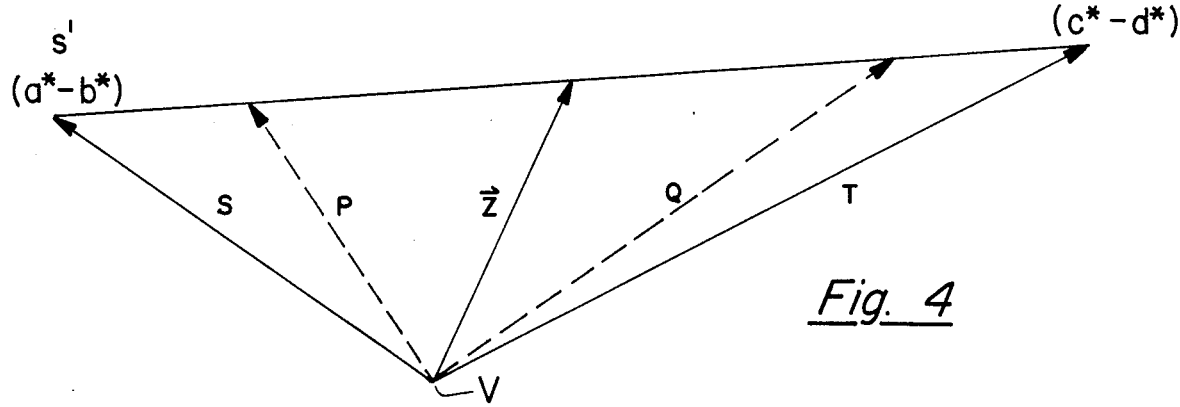
Fig. 4

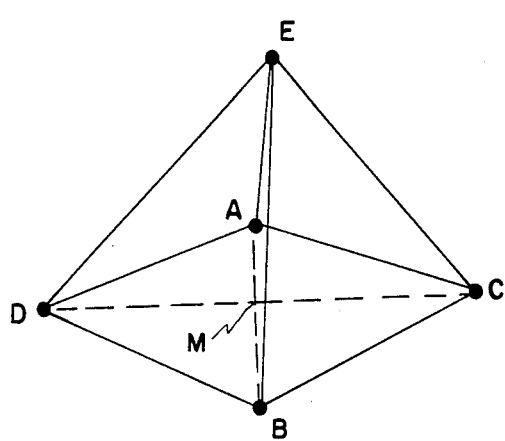
Fig. 5
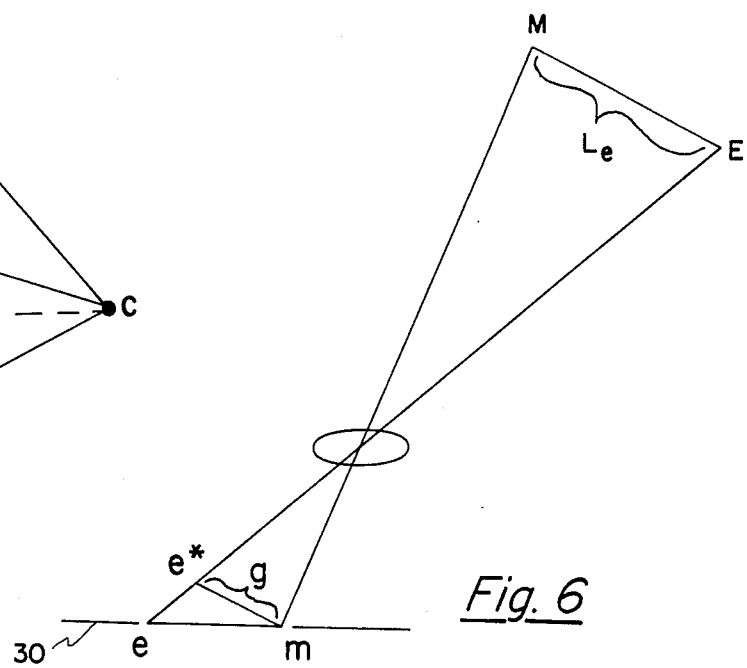
Fig. 6
Fig. 7
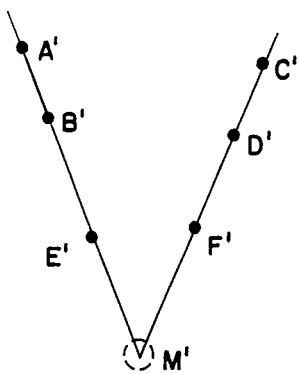

METHOD AND APPARATUS FOR DETERMINING LOCATION AND ORIENTATION OF OBJECTS

BACKGROUND OF THE INVENTION

The present invention relates to five and six degrees-of-freedom tracking systems by which spatial information, including the location (X,Y,Z) and oriention (roll, pitch, yaw) about an object in space (for example a robot arm, platform, or a helmet in an aircraft) can be accurately determined by electro-optical means. The invention has applications either in open-loop position locating systems or in closed-loop control systems.

Prior art systems include, among others, those shown in U.S. Pat. No. 4,396,945, entitled "Method of Sensing the Position and Orientation of Elements in Space" issued to Paul DiMatteo, et al and U.S. Pat. No. 4,238,828, entitled "Position Detecting Apparatus" issued to Andrew G. Hay, et al. The systems described in the above referred to patents include a plurality of target spots or points in fixed relationship to an object whose position is to be monitored. One or more cameras, having a field of view of the target spots, are provided to obtain a projection of the target points on one or more two dimensional image planes. Means are provided to generate signals representative of the two dimensional position coordinates of the image points on the image planes corresponding to the target points. From the position coordinate information of the image points corresponding to the target points, an analytical processer provides spatial information about the object relative to the image plane coordinate frame.

The arrangement of the target spots determines in part the mathematical processes to obtain the aforementioned spatial information. Heretofore, the prior art systems include the solution of a plurality of simultaneous equations usually in quadratic or higher order forms. Accordingly, processor times and complexity of the processer increase with such solutions.

A BRIEF DESCRIPTION OF THE INVENTION

A target plane comprises a first triad of three collinear target points and a second triad of three collinear target points where the second triad is in nonalignment with the first triad. A photo detector image plane obtains images of the target points projected through a lens located a fixed distance from the image plane. Simple algebraic manipulation of the coordinates of the images corresponding to the target points establishes a vector replica of the target points thereby providing sufficient data to provide a six degrees-of-freedom tracking solution including position and orienion of the object.

DESCRIPTION OF THE DRAWINGS

FIG. 1 is a vector diagram illustrating the principles of the invention using three collinear target points.

FIG. 2 shows an arrangement of target points using a pair of triads each having three collinear target points.

FIG. 3 illustrates the resolution of errors in the image points resulting from camera distortion.

FIG. 4 is a vector diagram illustrating the resolution of orthogonality of a pair of triads.

FIG. 5 is a vector diagram illustrating a five target point system including the pair of triads for enhancing system accuracy.

FIG. 6 shows a vector diagram utilizing the fifth point illustrated in FIG. 5.

FIG. 7 shows an arrangement of target points like those of FIG. 2.

DESCRIPTION OF THE INVENTION

FIG. 1 serves to provide a simple geometric description illustrating the principles of the invention. There shown is an object 10 having a triad of collinear identifiable target points, A, M, and B, in fixed relationship to object 10. The target points may be, by way of an example, illuminated painted spots having median center points A, M, and B. The spots may also be sources of light and the like. For purposes of the following discussion, the target points are considered to have no dimension. Further, the term collinear herein implies that the three points lie on the same line projection.

Also shown in FIG. 1 is an imaging means 15, such as a camera and the like, comprising a lens 20 a fixed distance, F, above a photoplane or image plane 30. The system as just described is provided for the purpose of obtaining "image points" on the image plane corresponding to the triad of "target points" projected thereon through the optical centerpoint of the lens. The camera system may be provided by a variety of techniques including a pin hole instead of a lens. Image plane 30 is intended to coinside with a two-dimensional array of radiation or light sensitive elements (not shown) such as charge coupled devices, photodiodes, and the like. Connected to these elements are electrical conductors 31. The elements may be scanned by an interrogator 32, through conductors 31, to determine the response of the light sensitive elements. Interrogator 32, through scanning of the array of light sensitive elements via conductors 31, provides signals 33 representative of the position coordinates of the image points on the image plane. Imaging means 15, as just described, is well known in the art and is described in, among others, the aforementioned U.S. Pat. Nos. 4,396,945 and 4,238,828.

In the diagram of FIG. 1, the origin is defined as the optical centerpoint 21 of lens 20, the Z-axis as normal to the image plane, and the X-axis and Y-axis parallel thereto. In the following discussion, Roman letters are used as point labels and also denote position vectors of the points relative to the origin, identified by the letter "O", which is the optical centerpoint 21. Further, Greek letters indicate scalar multipliers. As a further convenience, target point vectors are defined as running from the origin to the target point, and the image point vectors as running to the origin from the image point. The intersection of the image plane and a line perpendicular to the image plane and passing through the optical centerpoint defines the (O,O) coordinate of the image plane and has coordinates (O,O,F) relative to the origin 21.

In the present invention, imaging means 15 generates signals 33 representative of the coordinates of the image points a, m, and b. The position coordinates of a, m, and b define the vectors a, m, and b. Image points a, m, and b are those image points projected on the image plane from the target points A, M, and B on object 10. Position coordinate information of the image points on the image plane may be provided by a variety of scanning techniques well known in the art. However, it is imperative in the practice of the invention to obtain the position coordinates of a median point on the image plane of the image spot produced thereon through the imaging means optics. The greater the resolution the greater will be the tracking accuracy.

Vector M represents the object position, and vector AB, after dividing by its magnitude, provides a direction or unit vector. Vector AB contains "⅔" of the object orientation information, pitch and yaw, but is insufficient to provide an indication of roll.

Conceptionally, there exists a "scaled vector replica" of AMB through m, denoted a*mb* as identified by numeral 40. Vector replica point a* lies along a projection of a line through target point A and image point a, and b* lies along a projection of a line through target point B and image point b. With these constraints, the ratio of vector M to vector m is equal to the ratio of the object length L, defined to be the distance between target points A and B, to the magnitude of the difference between vectors a* and b*. Thus, the scalar is defined as:

$$\mu = \frac{L}{|a^* - b^*|} \quad (1)$$

whence:

$$M = \mu m \quad (2)$$

The direction vector aligned with the vector ab may be defined as the unit vector direction of A−B given by:

$$u = \frac{(A - B)}{L} \quad (3)$$

$$= \frac{(a^* - B^*)}{|a^* - b^*|} \quad (4)$$

In the following analysis, the three target points are such that M is the midpoint between A and B. Therefore, the ratio of distance MA to MB is one. Accordingly, image point m is the midpoint of a* and b*. Thus, $$2m = a^* + b^* \quad (5)$$

Since points a* and b* lie along vectors a and b, they are some scalar multiples thereof:

$$a^* = \alpha a \quad (6)$$

$$b^* = \beta b$$

Hence:

$$2m = \alpha a + \beta b \quad (7)$$

Since the image points a, b, and m are coplaner, vector cross-products of them are all collinear (i.e., normal to the common plane). So, α and β may be resolved by vector-producting m with a vector a and with vector b:

$$2m \times a = \alpha a \times a + \beta b \times a \quad (8)$$

$$= \beta(b \times a)$$

$$\beta \frac{2(m \times a)}{(b \times a)}$$

Note: "x" implies vector cross-product, above and below.

Similarly, $$\alpha = \frac{2(m \times b)}{(a \times b)} \quad (9)$$

Usually, vector division is considered improper. But, the scalar quotient of two collinear vectors can be defined as the ratio of any pair of components along the same direction. For example, $$\frac{3i + 12j - 9k}{i + 4j - 3k} = \frac{3}{1} = \frac{12}{4} = \frac{-9}{-3} = 3$$

Therefore, the perpendicular-to-image plane components of the quotient vectors may be used to compute the coefficients α and β. These are formed by vector-multiplying image plane position coordinates of image points a, b, and m. Thus, the coefficients may be determined by:

$$\alpha = \frac{2[m_x b_y - m_y b_x]}{a_x b_y - b_x a_y} \quad (10)$$

$$\beta = \frac{2[m_x a_y - m_y a_x]}{a_y b_x - a_x b_y} \quad (11)$$

Where subscripts "x" and "y" denote the image plane coordinates of the image points.

Having solved for α and β, vectors a* and b* become:

$$a^* = \alpha a$$

and $$b^* = \beta b$$

It should be understood by the reader that vectors a and a*, and vectors b and b* contain all three components. Vectors a and b each have an out-of-plane component which is identically equal to the coordinate distance F. The three components of vectors a* and b* are each calculated. Therefore, the "out-of-plane" components of a* and b* are vectorially determined according to the vector relationships just above.

Having solved for the vectors a* and b*, μ is obtained by use of equation (1) to solve for the orientation (position) vector M in accordance with equation (2). Here again, the vector m consists of all three coordinate components, the x and y coordinate positions and the out-of-plane position F.

Finally, the direction vector of A−B is:

$$u = \frac{(a^* - b^*)}{|a^* - b^*|} \quad (12)$$

In the analysis just described, it was assumed that image point m is collinear with image points a and b. Any deviation of m is treated in an inconsistent fashion. For instance, the alpha and beta computations assume collinearity of m with a and b. But, the full deviated value of m is used to generate M. FIG. 3 illustrates the situation where the image point m is not collinear with image points a and b. In this situation a rationally weighted straight line best fit for a, m, and b may be utilized before generating the coefficients α and β which ultimately determines the direction vector of the target points a and b.

In the analysis above, M as assumed to be the midpoint of AB. It should be noted that target point M is not restricted to be only the midpoint. If M is not the midpoint, then the ratio of MA/MB must be known or distances MA and MB must be accurately known. Further, the analysis above must then be appropriately modified to arrive at a somewhat different expression for vector equations (5) and coefficient equation (10) and (11).

For example, if the ratio $MA/MB = \frac{1}{3}$, then equation (5) becomes:

$$2m = \frac{2a^*}{3} + \frac{b^*}{3}$$

The coefficient 2 in equation (10) becomes 3/2, and the coefficient 2 in equation (11) becomes 3.

4-TARGET POINT SYSTEM

(Two Triads of Collinear Target Points)

As indicated above, the 3-Target Point method and apparatus described above produces a direction vector aligned with the triad of collinear target points to describe orientation and produces an object orientation vector to describe the position of the triad of collinear target points. The system as described provides sufficient spatial information for five degrees-of-freedom of orientation and position information. By using a second triad of collinear target points which is in nonalignment with the direction vector of a first triad of collinear target points, spatial information about an object, having six degrees-of-freedom of position and orientation may be obtained. This is so since the pitch and yaw of the two direction vectors corresponding to the two triads may be mathematically combined to provide roll—the sixth degree-of-freedom. Such an array of target points is described in FIG. 2.

In FIG. 2 a first triad of collinear target points is illustrated having target points A and B, and a second triad of collinear target points having target points C and D such that the vectors AB and CD are diagonals of a square, and the third target point of each triad is the intersection and centerpoint of each diagonal.

With the camera system of FIG. 1 described above, target points A, B, C, and D will project image points a, b, c, and d on image plane 30 in the manner illustrated in FIG. 1. From the position coordinates of a, b, c, and d provided by imaging means 15 on image plane 30, the common image point m may be synthesized using simple linear analysis. This is accomplished by determining the coordinates of the intersection of lines segments ab and cd which defines the coordinates of the image point m.

It should be noted by the reader that the arrangement of target points set forth in FIG. 2 is merely exemplary and provides a simple system as should be recognized by those skilled in the art. It is, of course, possible to provide two separate triads of three collinear target points in fixed relationship to an object such as shown in FIG. 7. Any pair of triads which are coplanar that do not have the same direction vector and have a common point of intersection. It should also be noted that the four target point arrangement illustrated in FIG. 2 need not form a square. The third target point of each triad may be provided directly or synthesized. That is, the third target point of each triad—the two other points being points A and B of one triad, and points C and D of the second triad—may be the common intersection point. A corresponding image point may be synthesized as described earlier using only four image points and the intersection of line projections on the image plane. Therefore, it is left to the artisan to either synthesize the common intersecting point or provide separate "third" target points for imaging on the image plane.

Again, referring to the special case of the four point square array of target points A, B, C, and D having a common centerpoint M, the missing centerpoint, of course, may be synthesized from the four outer image points since it is known that the image points AMB and CMD are separately collinear. The following two vector equations may be written:

$(m-a) \times (m-b) = 0$ $(m-c) \times (m-d) = 0$

These reduce to:

$m \times (a-b) + (a \times b) = 0$ $m \times (c-d) + (c \times d) = 0$ \hfill (13)

Applying equation (13) for just the in-plane parts of image point vectors m, a, b, c, and d, vector m may be written as:

$m = r + \phi(a-b) + \theta(c-d)$ \hfill (14)

where $$r = \frac{a + b + c + d}{4}$$

and where $\phi$ and $\theta$ are scalars, to be determined.

Substituting (equation 14) into equation (13) we get:

$r \times (a-b) - \theta(a-b) \times (c-d) + (a \times b) = 0$
$r \times (c-d) + \phi(a-b) \times (c-d) + (c \times d) = 0$ \hfill (15)

Further substitutions and reductions yield equations $$\theta = \frac{[(c + d) - (a + b)] \times (a - b)}{4[(a - b) \times (c - d)]} \quad (16)$$

$$\phi = \frac{[(c + d) - (a + b)] \times (c - d)}{4[(a - b) \times (c - d)]}$$

Thus the results of equation (16) may be substituted into equation (14) for obtaining the coordinates of image point m.

Having m, direction vectors corresponding to $a^* - b^*$ and $c^* - d^*$ may be obtained in the manner described earlier with respect to FIG. 1. That is, the position coordinates of a, b, and m are substituted in equations (6), (10), and (11) to solve for $a^*$ and $b^*$. Further, the position coordinates of c and d are substituted for a and b in the same equations to solve for $c^*$ and $d^*$.

Computations of direction vectors for $a^* - b^*$ and $c^* - d^*$ should result in vectors of equal magnitude but mutually orthogonal. However, due to various imperfections in the optical system and the resolution of the position coordinate information on the image plane, some deviations may be present. In order to compensate for such deviations, the following approach may be used.

Referring now to FIG. 4, there shown are vectors $a^* - b^*$ and $c^* - d^*$ in a non-orthogonal relationship and having unequal magnitudes. Define vectors S and T from the vertex point V of FIG. 4 having end points S' and T':

$$S = a^* - b^*$$

and $$T = c^* - d^*$$

Define vector Z as the vector to the midpoint of the line from point S' to point T':

$$Z = \frac{S + T}{2} \quad (17)$$

Further, orthogonal vectors P and Q can be defined as running from the vertex point, V, to the two points on the vector T−S, namely line S'T', which are at a distance equal to the length of Z from the terminal point of Z on T−S. These are computed thus:

$$P = Z - \frac{(S - T) \cdot |Z|}{|S - T|} \quad (18)$$

$$Q = Z + \frac{(S - T) \cdot |Z|}{|S - T|}$$

Where $|Z|$ and $|S-T|$ denote the magnitudes of Z and S−T respectively.

Due to measurement noise, etc., P and Q will be of unequal length. The best estimate of the proper common length is the root-mean square of the lengths of S and T:

$$R = \sqrt{\frac{S^2 + T^2}{2}}$$

The coefficient λ is, then:

$$\mu = \frac{L}{R}$$

when L is the known target point separation of a pair of target points as before.

Unit vectors of P and Q become:

$$u = \frac{P}{|P|} \quad (19)$$

$$v = \frac{Q}{|Q|}$$

A 3-square matrix "H" represents the orientation (pitch, yaw, and roll) relative to a selected reference coordinate frame. The reference coordinate frame may be that established by the image plane and the optical center point.

The complete three axes attitude matrix (pitch, yaw, and roll) of the object is obtained using the unit vectors u and v:

$$H = \begin{vmatrix} u & v & u \times v \\ \downarrow & \downarrow & \downarrow \end{vmatrix} \quad (20)$$

Note that if the object body axes I, J, and K are in alignment with the reference coordinate frame, then the diagonal of the matrix H is "1", and all other values zero. As the object rotates in any direction, corresponding component values will appear in the matrix. In turn, the matrix H may be evaluated in a well known manner to arrive at the orientation of the object relative to the reference coordinate frame. Columns u, v, and u×v, represent the unit vector components described in inertial space—namely, the selected reference coordinate frame.

The above matrix assumes that the object body axes I, J, as being along the AB and CD directions. If not, a constant attitude matrix, G, may be added to express the representations of AB and CD in the selected body axes, giving:

$$H = \begin{vmatrix} u & v & u \times v \\ \downarrow & \downarrow & \downarrow \end{vmatrix} G \quad (21)$$

It should be noted that the best fit analysis described with reference to FIG. 3 is somewhat irrelevant to the four-point system in which the common centerpoint is synthesized since the centerpoint is uniquely determined to fit the four image points a, b, c, and d.

5-TARGET POINT SYSTEM

The object attitude resolution of the pair of triads of collinear and coplanar target points may be further improved by the addition of an out-of-plane target point away from the target plane containing the pair of triads. FIG. 5 illustrates the four-point square target points like those of FIG. 2, but with the addition of a fifth target point E out of the target plane. The additional point E will provide improved orientation determination.

Referring now to FIGS. 5 and 6, target point E projects an image point e on image plane 30. As before, the missing image point m is constructed from image points a, b, c, and d. Then, also as before, the vector M is determined. Further enhancement of attitude resolution is provided by generating a "scale vector replica of vector EM". This is accomplished by finding point e* along the line projected through target point E and image point e such that the length of e*−m is equal to the length $L_e$ of E−M divided by μ.

$$e^* - m = \frac{E - M}{\mu} \quad (22)$$

and $$|e^* - m| = \frac{L_e}{\mu}$$

Let $e^* = \gamma e$, where γ is a unknown scalar, to be determined. Then let the length of vector e*−m be equal to g such that:

$$g^2 = (e^* - m)^2 = m^2 + \gamma^2 e^2 - 2\gamma e m$$

$$g = (L_e/\mu)^2$$

This rearranges to the quadratic equation in γ:

$$e^2 \gamma^2 - 2(e \cdot m)\gamma + m^2 - (L_e/\mu)^2 = 0 \quad (23)$$

Having solution:

$$\gamma = \frac{e \cdot m + \sqrt{(e \cdot m)^2 - e^2(m^2 - (L_e/\mu)^2}}{e^2} \quad (24)$$

Generally, field of view considerations dicatate that the negative value of the radical be selected. This implies that the target point E protrudes above the ABCD target plane, and is closest to the camera eye. This can be modified as needed for the situation. Having $\gamma$, we get $e^* - m$ as:

$$e^* - m = \gamma e - m \quad (25)$$

If target point E is substantially perpendicular to the target plane established by target points a, b, c, and d, then vector $e^* - m$ should be given full weight as defining the object K-axes of the coordinate system established by the vector replicas. The other two vectors, $a^* - b^*$ and $c^* - d^*$, are corrected as needed, so that they are both orthogonal to $e^* - m$. To do this, any components of $a^* - b^*$ and $c^* - d^*$ along $e^* - m$ must be found and then subtracted from their corresponding vectors. Then, these connected vectors may be processed to yield the I and J object body axis unit vectors. The corrections are done as follows:

$$(a^* - b^*)' = (a^* - b^*) - [K \cdot (a^* - b^*)]K \quad (26)$$

$$(c^* - d^*)' = (c^* - d^*) - [K \cdot (c^* - d^*)]K \quad (27)$$

Where ' denotes corrected version, and $$K = \frac{e^* - m}{|e^* - m|}$$

Where $e^* - m$ is the result of equation (25). These corrected vectors can then be used to determine the attitude matrix as per equations (17) through (20).

The computations just presented utilize the position coordinates of the image points. These computations may be performed by any arithmetic processor, such as a computer and the like for carrying out the computations. FIG. 1 shows a computer 100 receiving signals 33 representative of th position coordinates of the image points for carrying out the computations for calculating vector replicas, direction vectos, and/or position and orientation calculations. The computer in turn may be coupled, for example, to a CRT 101 for numeric or pictorial displays, an independent robot 102 for control thereof in response to the position and orientation of the object 10, and/or the object 10 as part of a closed loop control system.

From the above it will be evident that the invention comprises an optical system employing (i) at least one triad of collinear target points fixed in relationship to an object, (ii) an imaging means having an image plane defining a reference coordinate system with a field of view including the target points for obtaining image points on the image plane corresponding to the target points projected thereon, (iii) imaging means providing position coordinate information of each image point, and (iv) a computational device for processing the position coordinate information in a predetermined manner so as to allow determination of position and orientation of the object relative to the reference coordinate system. In one embodiment of the invention, a means is provided for determining vector replicas of at least two of the target points for determining a direction vector which is in alignment with the triad of collinear target points thereby providing pitch and yaw information. Further, the manipulation of the vector replica in addition to known target point separation information provides object position information. Therefore, from the 3 collinear image points on a two dimensional image plane, a 5 degrees-of-freedom tracking system may be provided.

In a further embodiment, an oblique or perpendicular pair of triads of collinear target points utilizing essentially the same system configuration and method provides sufficient information for obtaining the object vector and orientation (pitch, yaw, and roll) of a target plane containing the triad-pair—i.e. six degrees-of-freedom tracking system.

Further resolution enhancements have also been described herein. Namely, a four-target point system in which a pair of target points forms in part a first triad of collinear target points, and a second pair which forms in part a second triad of collinear target ponts, and wherein said target-point pairs are the diagonals of a square, and the intersection of the diagonals provides the third target point of each triad. A method and means for synthesizing the common centerpoint has been shown. The four-pont square target point array provides sufficient information for monitoring orientation and position of a target plane with six degrees of freedom. Other enhancements include straight line fitting and orthogonal fitting of the triads.

Lastly, the four-point square array has been shown with an out-of-plane fifth target point for enhancing the attitude resolution of the four target point system. The 5-point system enhances resolution of a corner axis perpendicular to the target plane containing the pair of triads of collinear target points.

It will be evident to those skilled in the art that the target points may be simple spots which may be painted on the object, or projected onto an object from a light source and the like. The imaging system may also be provided by a wide range of optical systems for obtaining the position coordinates of the image points corresponding to the target points. The greater the resolution of obtaining the image points the greater will be the accuracy of the orientation measuring system.

Nevertheless, changes may be made in detail especially in matters of shape, size, and arrangement of the parts, within the principles of the invention, to the full extent indicated by the broad general meaning of the terms in which the independent claims are expressed.

The embodiments of the invention in which an exclusive property or right is claimed are defined as follows:

1. A method of determining spatial information about an object relative to a reference coordinate frame comprising:

providing at least three identifiable collinear target points which lie on a single line projection, and in which said target points are in fixed relationship to said object;

obtaining image points on an image plane corresponding to said three collinear target points projected thereon;

determining position coordinates of said image points on said image plane; and determining a direction vector in alignment with said collinear target points from said position coordinates of said image points.

2. The method of claim 1 including the step of determining first and second scaled vector replicas corresponding to the position of first and second ones, respectively, of said three collinear target points from said position coordinates of said image points, said scaled vector replicas being in a reference coordinate system defined by said image plane and an optical centerpoint through which said projections of said target points pass, each of said scaled vector replicas having direction and magnitude replicating a vector from said optical centerpoint to said corresponding target point.

3. The method of claim 2 further comprising the steps of:

determining a first coefficient as a function of said position coordinates of said image points;

determining a second coefficient as a function of said position coordinates of said image points;

determining said first scaled vector replica as a function of the product of said first coefficient and a vector describing a first one of said image points relative to said optical centerpoint;

determining said second scaled vector replica as a function of the product of said second coefficient and a vector describing a second one of said image points relative to said optical centerpoint; and determining said direction vector as a function of said first and second scaled vector replicas.

4. The method of claim 3 wherein said first and second target points, P1 and P2, having corresponding image points, a and b, are the extremities of said three collinear target points, and said first and second coefficients are of the form:

$$\alpha = \frac{[m_x b_y - m_y b_x]}{a_x b_y - b_x a_y}$$

and, $$\beta = \frac{[m_x a_y - m_y a_x]}{a_y b_x - a_x b_y}$$

where X and Y denote coordinates of said image points on said image plane relative to the origin thereof defined by the intersection of said image plane and a line perpendicular to the image plane and passing through said optical centerpoint, and image point m corresponds to said third target point.

5. The method of claim 3 further comprising the step of determining an object position vector relative to said reference coordinate frame as a function of a known target separation between at least two of said target points and the vector magnitude of the difference between said first and second scaled vector replicas.

6. The method of claim 1 further comprising the step of determining the position of said target points relative to said reference frame from said position coordinates of said image points and a known target separation between at least two of said target points.

7. The method of claim 1 further comprising the step of modifying said image point coordinate values to determine three modified image points which correspond to said target points.

8. A method of determining spatial information about an object relative to a reference coordinate frame comprising:

providing a first triad of collinear target points lying on a single line projection including at least first and second identifiable target points thereof, and a second triad of collinear target points including at least first and second identifiable target points thereof, said first and second triads each being in fixed relationship to said object and each having different direction vectors so as to define a target plane;

determining position coordinates of image points on an image plane, said image points corresponding to projections of said first and second triad of target points onto said image plane; and determining the orientation of said target plane relative to said reference coordinate frame from said position coordinates of said image points.

9. The method of claim 8 including the step of determining first and second scaled vector replicas corresponding to the position of first and second ones, respectively, of said first triad of target points, and third and fourth scaled vector replicas corresponding to first and second ones, respectively, of said second triad of target points, from said position coordinates of said image points, said scaled vector replicas being in a reference coordinate system defined by said image plane and an optical centerpoint through which said projections of said target points pass, each of said scaled vector replicas having direction and magnitude replicating a vector from said optical centerpoint to said corresponding target point.

10. The method of claim 9 comprising the steps of:

determining a first coefficient as a function of said position coordinates of said image points;

determining a second coefficient as a function of said position coordinates of said image points;

determining said first scaled vector replica as a function of the product of said first coefficient and a vector describing a first one of said image points relative to said optical centerpoint and corresponding to said first one of said first triad of said target points;

determining said second scaled vector replica as a function of the product of said second coefficient and a vector describing a second one of said image points relative to said optical centerpoint and corresponding to said second one of said first triad of said target points;

determining a first direction vector in alignment with said first triad of target points as a function of said first and second scaled vector replicas;

determining a third coefficient as a function of said position coordinates of said image points;

determining a fourth coefficient as a function of said position coordinates of said image points;

determining said third scaled vector replica as a function of the product of said third coefficient and a vector describing a third one of said image points relative to said optical centerpoint and corresponding to said first one of said second triad of said target points;

determining said fourth scaled vector replica as a function of the product of said fourth coefficient and a vector describing a fourth one of said image points relative to said optical centerpoint and corresponding to said second one of said second triad of said target points; and determining a second direction vector in alignment with said second triad of target points as a function of said third and fourth scaled vector replicas.

11. The method of claim 10 further comprising the step of synthesizing image points m and n from position coordinate values of image points a, b, c, and d, said image points m and n being a common point corresponding to the intersection of a projection of a first line passing through points a and b with a projection of a second line passing through image points c and d.

12. The method of claim 10 wherein said first and second target points, P1 and P2, having corresponding image points a and b, are the extremities of said first triad of target points and said first and second coefficients are of the form:

$$\alpha_1 = \frac{[m_x b_y - m_y b_x]}{a_x b_y - b_x a_y}$$

and, $$\beta_1 = \frac{[m_x a_y - m_y a_x]}{a_y b_x - a_x b_y}$$

and wherein said first and second target points, Q1, Q2, projecting image points c and d, are the extremities of said second triad of target points and said third and fourth coefficients are of the form:

$$\alpha_2 = \frac{[n_x d_y - n_y d_x]}{c_x d_y - d_x c_y}$$

and, $$\beta_2 = \frac{[n_x c_y - n_y c_x]}{c_y d_x - c_x d_y}$$

where X and Y denote coordinates of said image points on said image plane relative to the origin thereof defined by the intersection of said image plane and a line perpendicular to the image plane and passing through the optical centerpoint, and m and n are image points projected from third target points P3 and Q3 of said first and second triads of target points.

13. The method of claim 10 wherein said direction vectors of said target point triads are orthogonal and said method further comprises the step of resolving orthogonal deviations between said first and second calculated direction vectors.

14. The method of claim 9 further comprising the step of determining an object position vector relative to said reference coordinate frame as a function of a known target separation between said first and target points of one of said triads and the vector magnitude of said first and second scaled vector replicas.

15. The method of claim 8 wherein said first and second triad of target points share a common third target point.

16. The method of claim 15 wherein a pair of each of said target points of each of said triads forms a diagonal of a parallelogram and said third target point is the intersection of said diagonals.

17. The method of claim 16 wherein said parallelogram is a square.

18. The method of claim 15 including the step of synthesizing the position coordinates of an image point corresponding to said third target point from said image point position coordinate values corresponding to said first and second target points of each of said triads.

19. The method of claim 8 further including the steps of:
 providing an out-of-plane target point having a known third target separation between said out-of-plane target point and one of said target points in said target plane;
 determining position coordinates of an image point corresponding to the projection of said out-of-plane target point on said image plane;
 determining from said out-of-plane image point position coordinates and said third target separation a third direction vector in alignment with a vector from one of said target points in said target plane to said out-of-plane target point; and
 correcting said first and second direction vectors as a function of said third vector replica.

20. The apparatus of claim 19 further comprising means for operating on said image point coordinate values and generating modified image point position coordinates which lie on a single line projection.

21. The method of claim 8 further comprising the step of determining the position of said object relative to said reference frame from said position coordinates of said image points and a known target separation between said first and second target points of one of said triads.

22. An apparatus for obtaining spatial information about an object relative to a reference coordinate frame comprising:
 at least first, second, and third collinear target spots, each having a median target point defining substantially collinear first, second, and third target points, respectively, and in which said first, second, and third target points lie on a single line projection, and in which said target points are, fixed in relation to said object;
 imaging means having a field of view including said target spots, said imaging means including an image plane for obtaining first, second, and third image spots corresponding to projections thereon of said target spots;
 first means for determining position coordinates of median image points of each image spot; and
 second means for determining a direction vector in alignment with said collinear target points from signals representative of said position coordinates of said image points.

23. The apparatus of claim 22 wherein said second means determines first and second scaled vector replicas corresponding to the position of first and second ones, respectively, of said three collinear target points from said position coordinates of said image points, said scaled vector replicas being in a coordinate system defined by said image plane and an optical centerpoint through which said projection of said target points pass, each of said scaled vector replicas having direction and magnitude replicating a vector from said optical centerpoint to said corresponding target point.

24. The apparatus of claim 23 wherein said second means,
 determines a first coefficient as a function of said position coordinates of said image points;
 determines a second coefficient as a function of said position coordinates of said image points;
 determines said first scaled vector replica as a function of the product of said first coefficient and a vector describing a first one of said image points relative to said optical centerpoint corresponding to said first one of said target points;
 determines said second scaled vector replica as a function of the product of said second coefficient and a vector describing a second one of said image points relative to said optical centerpoint corresponding to said second one of said target points; and
 means for determines said direction vector as a function of said first and second scaled vector replicas.

25. The apparatus of claim 24 wherein said first and second target points, P1 and P2, having corresponding image points, a and b, are the extremities of said three collinear target points, and said first and second coefficients are of the form:

$$\alpha_1 = \frac{[m_x b_y - m_y b_x]}{a_x b_y - b_x a_y}$$

and, $$\beta_1 = \frac{[m_x a_y - m_y a_x]}{a_y b_x - a_x b_y}$$

where X and Y denote coordinates of said image points on said image plane relative to the origin thereof defined by the intersection of said image plane and a line perpendicular to the image plane and passing through said optical centerpoint, and image point m corresponds to said third target point.

26. The apparatus of claim 24 wherein said second means determines an object position vector as a function of a known target separation between at least two of said target points and the vector magnitude of the difference between said first and second scaled vector replicas.

27. The apparatus of claim 22 wherein said second means determines the position of said points relative to said reference coordinate frame from signals representative of said position coordinates of said image points and a known value of target separation between at least two of said target points.

28. An apparatus for obtaining spatial information about an object relative to a reference coordinate frame comprising:
at least first, second, third, and fourth coplanar target spots, each having a median target point defining first, second, third and fourth target points, respectively, and in which said target points are fixed in relation to said object, said first and second target points lying along a projection of a first line passing therethrough, and said third and fourth target points lying along a projection of a second line passing therethrough and intersecting said first line;
imaging means having a field of view including said target spots, said imaging means including an image plane for obtaining first, second, third, and fourth image spots thereon corresponding to projections thereon of said target spots;
first means for determining position coordinates of first, second, third, and fourth median image points corresponding to said first, second, third, and fourth target points, respectively;
second means for,
determining a first direction vector in alignment with said first line and a second direction vector in alignment with said second line from signals representative of said position coordinates of said image points, and
determining the orientation of said object relative to said reference coordinate frame from said first and second direction vectors.

29. The apparatus of claim 28 wherein said seond means determines first and second scaled vector replicas corresponding to the position of said first and second target points, and third and fourth scaled vector replicas corresponding to said third and fourth target points, from said position coordinates of said image points, said scaled vector replicas being in a reference coordinate system defined by said image plane and an optical centerpoint through which said projections of said target points pass, each of said scaled vector replicas having direction and magnitude replicating a vector from said optical centerpoint to said corresponding target point.

30. The apparatus of claim 29 wherein said second means,
determines a first coefficient as a function of said position coordinates of said image points;
determines a second coefficient as a function of said position coordinates of said image points;
determines said first scaled vector replica as a function of the product of said first coefficient and a vector describing said first image point relative to said optical centerpoint;
determines said second scaled vector replica as a function of the product of said second coefficient and a vector describing said second image point relative to said optical centerpoint;
determines said first direction vector as a function of said first and second scaled vector replicas;
determines a third coefficient as a function of said position coordinates of said image points;
determines a fourth coefficient as a function of said position coordinates of said image points;
determines said third scaled vector replica as a function of the product of said third coefficient and a vector describing said third image point relative to said optical centerpoint;
determines said fourth scaled vector replica as a function of the product of said fourth coefficient and a vector describing said fourth image point relative to said optical centerpoint; and
determines said second direction vector as a function of said third and fourth scaled vector replicas.

31. The apparatus of claim 30 wherein said first, second, third, and fourth coefficients, $\alpha$, $\beta$, $\alpha_2$, and $\beta_2$, respectively, are of the form:

$$\alpha_1 = \frac{[m_x b_y - m_y b_x]}{a_x b_y - b_x a_y}$$

$$\beta_1 = \frac{[m_x a_y - m_y a_x]}{a_y b_x - a_x b_y}$$

$$\alpha_2 = \frac{[n_x d_y - n_y d_x]}{c_x d_y - d_x c_y}$$

and, $$\beta_2 = \frac{[n_x c_y - n_y c_x]}{c_y d_x - c_x d_y}$$

wherein said first and second target points, P1 and P2, are the extremities of said first triad of target points and where said first and second target points, Q1 and Q2, are the extremities of said second triad of target points and project image points c and d, and where X and Y denote coordinates of said image points on said image plane relative to the origin thereof defined by the intersection of said image plane and a line perpendicular to the image plane and passing through the optical centerpoint, and m and n are image points projected from third target points, P3 and Q3 of said first and second triads of target points.

32. The apparatus of claim 30 wherein the projections of said first and said second lines are orthgonal and said apparatus further comprises means for correcting orthogonal deviations between said first and second direction vectors.

33. The apparatus of claim 29 further including:
an out-of-plane target spot non-coplanar with said first, second, third, and fourth target spots, said out-of-plane target spot having a median target point defining an out-of-plane target point, and said out-of-plane target point having a known third target separation between said out-of-plane target point and a reference target point in the plane of said coplanar target points; and
wherein said first means determines position coordinates of a fifth image point corresponding to the projection of said out-of-plane target point on said image plane; and
wherein said second means, generates a third scaled vector replica corresponding to said out of plane target point, and
corrects said first and second determined direction vectors as a function of said third scaled vector replica.

34. The apparatus of claim 33 wherein said out-of-plane target point is such that a line projection passing therethrough and said point of intersection of said first and second lines is substantially perpendicular to a plane defined by said coplanar target points.

35. The apparatus of claim 29 wherein said second means determines an object position vector relative to said reference coordinate frame as a function of a known target separation between at least two of said target points and the vector magnitude of the difference between said first and second scaled vector replicas.

36. The apparatus of claim 28 wherein first and second pairs of said target points form diagonals of a parallelogram having a common intersection defining a fifth target point.

37. The apparatus of claim 36 wherein said parallelogram is a square.

38. The apparatus of claim 36 wherein said second means determines from said image point position coordinates the position coordinates of an image point corresponding to said fifth target point.

39. The apparatus of claim 28 further including:
an out-of-plane target spot non-coplanar with said first, second, third, and fourth target spots, said out-of-plane target spot having a median target point defining an out-of-plane target point, and said out-of-plane target point having a known third target separation between said out-of-plane target point and a reference target point in the plane of said coplanar target points;
means for obtaining a fifth image point on said image plane corresponding to the projection thereon of said out-of-plane target point;
means for determining position coordinates of said image point corresponding to said out-of-plane target point; and
means for correcting said first and second calculated direction vectors as a function of said position coordinates of said fifth image point.

40. The apparatus of claim 39 wherein said out-of-plane target point is substantially perpendicular to a plane defined by said coplanar target points and to the point of intersection of said first and second lines.

41. The apparatus of claim 28 wherein said second means determines the position of said target plane relative to said reference coordinate frame from said position coordinates of said image points and a known target separation between at least two of said target points.

42. The apparatus of claim 28 wherein said second means determines position coordinates of a fifth image point from said position coordinates of said first, second, third, and fourth image points, said fifth image point being on a projection of a first line passing through said first and second image points and being on a projection of a second line passing through said third and fourth image points.

43. A method of determining spatial information about an object relative to a reference coordinate frame comprising:
providing first, second, third, and fourth coplanar target points, said target points each being fixed in relationship to said object, said first and second target points defining a first line projection having associated therewith a direction vector, and said third and fourth target points defining a second line projection having a different direction vector, and wherein said first and second line projections intersect at a common point;
determining position coordinates of image points on an image plane, said image points corresponding to projections of said image points onto said image plane; and
determining the orientation of said target plane relative to said reference coordinate frame from said position coordinates of said image points.

44. The method of claim 43 including the step of synthesizing the position coordinates of an image point corresponding to the point of intersection of said first and second line projections from said image point position coordinate values.

45. Method of claim 44 further comprising the step of determining the position of said object relative to said reference frame from said position coordinates of said image points and a known target separation between said first and second target points.

46. The method of claim 43 including the step of determining first, second, third, and fourth scaled vector replicas corresponding to the position of said first, second, third, and fourth target points, respectively, from said position coordinates of said image points, said scaled vector replicas being in a reference coordinate system defined by said image plane and an optical centerpoint through which said projections of said target points pass, each of said scaled vector replicas having direction and magnitude replicating a vector from said optical centerpoint to said corresponding target point.

47. The method of claim 46 comprising the steps of:
determining a first coefficient as a function of said position coordinates of said image points;
determining a second coefficient as a function of said position coordinates of said image points;
determining said first scaled vector replica as a function of the product of said first coefficient and a vector describing a first one of said image points relative to said optical centerpoint and corresponding to said first one of said first triad of said target points;
determining said second scaled vector replica as a function of the product of said second coefficient and a vector describing a second one of said image points relative to said optical centerpoint and corresponding to said second one of said first triad of said target points;

determining a first direction vector in alignment with said first triad of target points as a function of said first and second scaled vector replicas;

determining a third coefficient as a function of said position coordinates of said image points;

determining a fourth coefficient as a function of said position coordinates of said image points;

determining said third scaled vector replica as a function of the product of said third coefficient and a vector describing a third one of said image points relative to said optical centerpoint and corresponding to said first one of said second triad of said target points;

determining said fourth scaled vector replica as a function of the project of said fourth coefficient and a vector describing a fourth one of said image points relative to said optical centerpoint and corresponding to said second one of said second triad of said target points; and determining a second direction vector in alignment with said second triad of target points as a function of said third and fourth scaled vector replicas.

48. The method of claim 43 wherein said first and second points define a first diagonal and said third and fourth target points define a second diagonal of a parallelogram defined by said first, second, third, and fourth target points.

* * * * *

UNITED STATES PATENT AND TRADEMARK OFFICE
CERTIFICATE OF CORRECTION

PATENT NO. : 4,672,564

DATED : June 9, 1987

INVENTOR(S) : W.H. Egli, J.W. Miller, J.M. Setterholm

It is certified that error appears in the above-identified patent and that said Letters Patent is hereby corrected as shown below:

Column 15, lines 6-14, delete "$\alpha_1 = \dfrac{[m_x b_y - m_y b_x]}{a_x b_y - b_x a_y}$ and $\beta_1 = \dfrac{[m_x a_y - m_y a_x]}{a_y b_x - a_x b_y}$ " and insert --

$\alpha = \dfrac{[m_x b_y - m_y b_x]}{a_x b_y - b_x a_y}$ and $\beta = \dfrac{[m_x a_y - m_y a_x]}{a_y b_x - a_x b_y}$ --.

Column 16, line 40, delete "$\alpha$, $\beta$," and insert --$\alpha_1$, $\beta_1$,--.

UNITED STATES PATENT AND TRADEMARK OFFICE
CERTIFICATE OF CORRECTION

PATENT NO. : 4,672,564

DATED : June 9, 1987

INVENTOR(S) : W.H. Egli  J.W. Miller, J.M. Setterholm

It is certified that error appears in the above-identified patent and that said Letters Patent is hereby corrected as shown below:

Column 20, line 2, delete "project" and insert --product--.

Signed and Sealed this

Sixth Day of October, 1987

Attest:

DONALD J. QUIGG

Attesting Officer

Commissioner of Patents and Trademarks